May 18, 1954 H. B. COULTER 2,678,730
FLOCCULATION AND SEDIMENTATION
Filed Feb. 2, 1951 4 Sheets-Sheet 3

INVENTOR:
HAROLD B. COULTER,
BY John E. Hubbell
ATTORNEY

May 18, 1954   H. B. COULTER   2,678,730
FLOCCULATION AND SEDIMENTATION
Filed Feb. 2, 1951   4 Sheets-Sheet 4

INVENTOR:
HAROLD B. COULTER,
BY
John E. Hubbell
ATTORNEY

Patented May 18, 1954

2,678,730

UNITED STATES PATENT OFFICE 2,678,730

FLOCCULATION AND SEDIMENTATION

Harold B. Coulter, Larchmont, N. Y., assignor to The Dorr Company, Stamford, Conn., a corporation of Delaware Application February 2, 1951, Serial No. 209,179

19 Claims. (Cl. 210—55)

The general object of the present invention is to provide a novel and effective combination of flocculation and sedimentation apparatus, especially characterized by its mechanical simplicity, for separating liquid and solids suspended therein when some, at least, of the solids are of such character that they must be flocculated before it is practically possible to separate them from the liquid by sedimentation.

A combination of flocculation and sedimentation apparatus which has been found to be practically effective for settling solids requiring flocculation preparatory to their sedimentation, is disclosed in the Darby et al. patent, No. 2,143,750, granted January 10, 1939. A primary object of the present invention is to provide combined flocculation and sedimentation apparatus structurally and operatively simpler than the apparatus of said prior patent, and practically operable, under some conditions at least, to produce as good or better flocculation and sedimentation effects as are produced with the apparatus of said prior patent.

In the present invention, use is made of a flocculation section separate and distinct from a larger sedimentation section which surrounds and underlies the flocculation section, generally as in said prior patent. However, my flocculation section does not include rotating flocculation paddles which are characteristic elements of said prior patent. With the present invention, moreover, a significant portion of the flocculation effect obtained is produced in the portion of the sedimentation section adjacent the flocculation section, and is the result of the novel manner in which the liquid treated and solids suspended therein, and inadequately flocculated in the flocculation section, are passed from the flocculating section into said portion of the sedimentation section.

A specific object of the invention is to provide novel and effective means for moving the material to be flocculated through a flocculation section, preferably but not necessarily rotatable, and having tortuous outlet passages through which liquid solids in suspension, including some solids flocculated and partially flocculated in said section, are passed into the adjacent sedimentation space in such manner as to subject said solids to further flocculation.

In its preferred form, the flocculation and sedimentation sections of my novel unit are separated by partition means which form the bottom and uprising walls of a rotatable flocculation chamber arranged to serve as a feed well, and of submerged spout-like, liquid conducting arms, or discharge conduits, connected to and extending away from said chamber. Said arms are in communication at their inner ends with said chamber and have emission ports or discharge outlets on the leading and on the trailing sides of said arms, and preferably adjacent the outer ends of the arms. The latter present tortuous fluid paths to the liquid passing therethrough into said sedimentation space. The liquid treated is passed into the turning flocculation chamber or feed well to thereby establish and maintain a body of solids in liquid suspension which is fed into said body with sufficient velocity to effect mobilization of solids of the suspension and to effect motion of such suspension through the body at solids flocculation speed. The drifting suspension is thus deflectively moved from the turning body into a body of sedimenting suspension at a plurality of points laterally extending from the periphery of the turning body in directions paralleling the direction of motion of that body. Thus the liquid treated is subjected to an initial flocculation action as it flows through the feed well, and is subjected to a further flocculation effect as it flows through said arms and into said sedimentation space.

Further flocculation is effected in the sedimentation space as a result of a relative arrangement of flocculating outlets which cause the liquid stream discharged through each outlet to intercept the stream discharged through an adjacent outlet. Such interceptions produce general liquid turbulence and liquid motion in the sedimentation section which cause small flocs to collide and cohere to one another. Furthermore, with the outlet arrangement hereinafter described, the liquid turbulence and motion of the liquid cause suspended flocs to engage and be deflected by external surfaces of the feed well structure. Such engagements and deflections contribute to the coagmentation or amassment of the suspended solids into flocs of settleable size and density.

In a preferred form of the invention, the flocculation section of the apparatus includes discharge conduits extending horizontally away from the uprising peripheral wall of the feed well. Those conduits, which may also be called spouts or stub extensions of the flocculating feed well, are characterized by the tortuous character of the paths of flow through them, the closure of their outer ends, and their opposed lateral discharge outlets adjacent their closed ends and through which liquid streams are discharged in directions tangential to the path of movement of the rotating outlets.

In some cases the upper portion of the sedimentation space may advantageously be divided into inner and outer annular portions by a relatively short cylindrical baffle or curtain wall surrounding and spaced radially outward from the sedimentation space. Said cylindrical baffle or curtain wall has the practical effect of increasing the time period in which the drifting flocs passing from the feed well through the liquid conducting arms are kept within the space in which the drifting flocs are favorably positioned for engagement with and attachment to one another.

The liquid to be treated in the apparatus may be passed into the feed well in various known ways. In the forms of the invention illustrated, the liquid treated is passed into the feed well through an elevated conduit which extends over the sedimentation space to the feed well from the space surrounding said basin. However, the liquid treated may be otherwise supplied to the feed well.

The invention is adapted for use in units varying widely with their dimensions, and in the immediate purposes of their respective uses. For example, the invention may be used with advantage in so called "thickener" units for recovering inorganic solids from liquid, as in metallurgy. The invention is also well adapted for use in so called "clarifiers" units separating organic solids from liquid to clarify the latter. The invention is also well adapted for use in so called "hydroseparators" serving a classifier purpose, such for example, as the separation of light clayey material from mineral pebbles or analogous small mineralogical bodies recovered in sludge form.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 1:
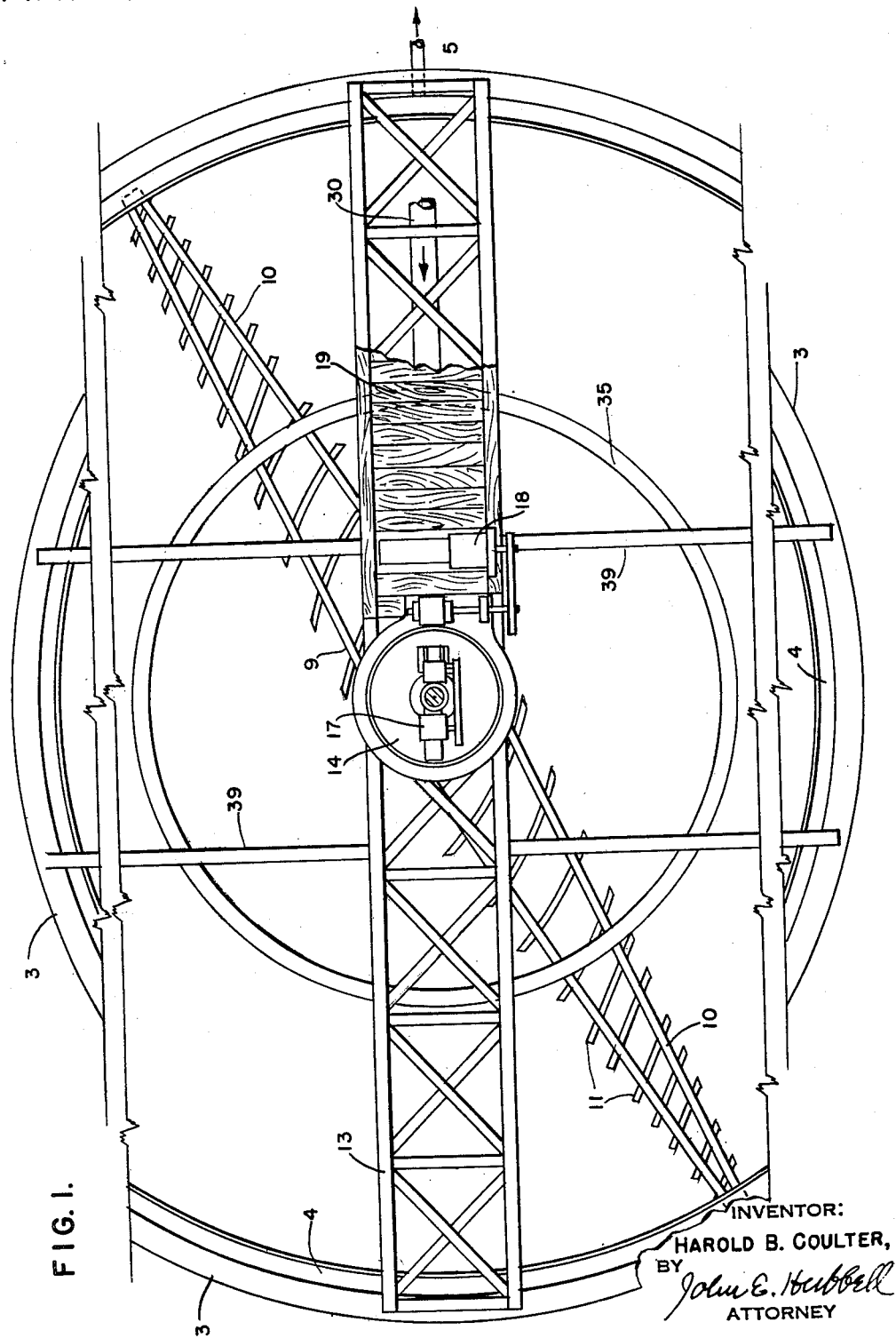
Fig. 1 is a plan view of a flocculation and sedimentation unit.

In Figs. 1 to 4, I have illustrated the use of a flocculation and sedimentation unit comprising a sedimentation basin 1 having a slightly conical concrete bottom wall 2 and a rim portion 3. The rim portion is shaped to provide a launder 4 receiving liquid, overflowing from the basin 1 and from which solids have been settled in said basin. The launder 4 is connected to a discharge conduit 5 and fixes the normal liquid level in the basin. The bottom wall of the basin 1 is formed with a central depending discharge cone 7 terminating in a bottom outlet 8.

Mounted in the basin 1 is a rotatable rake structure 9 shown as comprising two arms or truss members 10 of customary type, which extend in opposite directions away from the central portion of the structure. Each arm carries inclined scraper elements 11, and the central portion of the structure is provided with a central scraper 12 of conventional form which extend down into the discharge cone 7. The rake structure 9 may be suspended and rotated in any usual or suitable manner. In the desirable construction illustrated in Figs. 1 and 2, the rake structure is suspended from a bridge structure 13 which extends diametrically across the basin and has its ends supported by the corresponding portions of the rim structure.

As shown, the suspension and rotating mechanism for the rake structure 9 comprises a drive head 14 journalled by roller bearing means mounted in an annular race-way member 15. The latter is supported by the bridge 13 and coaxial with the rotating rake structure 9. The drive head 14 is connected to the rake structure through a vertical shaft 16 having its lower portion anchored in the rake structure and having an upper end portion connected to the drive head 14 to rotate with the latter.

The bridge 13 also supports a motor driven drive mechanism which may be of conventional form, and is gear connected to the drive head 14 to slowly rotate the latter in customary manner. The portion of the bridge at one side of the annular race-way 15 is provided with a floor and serves as a walk-way 19 for use in inspecting, adjusting or repairing the rake driving and lifting mechanisms.

Figure 2:
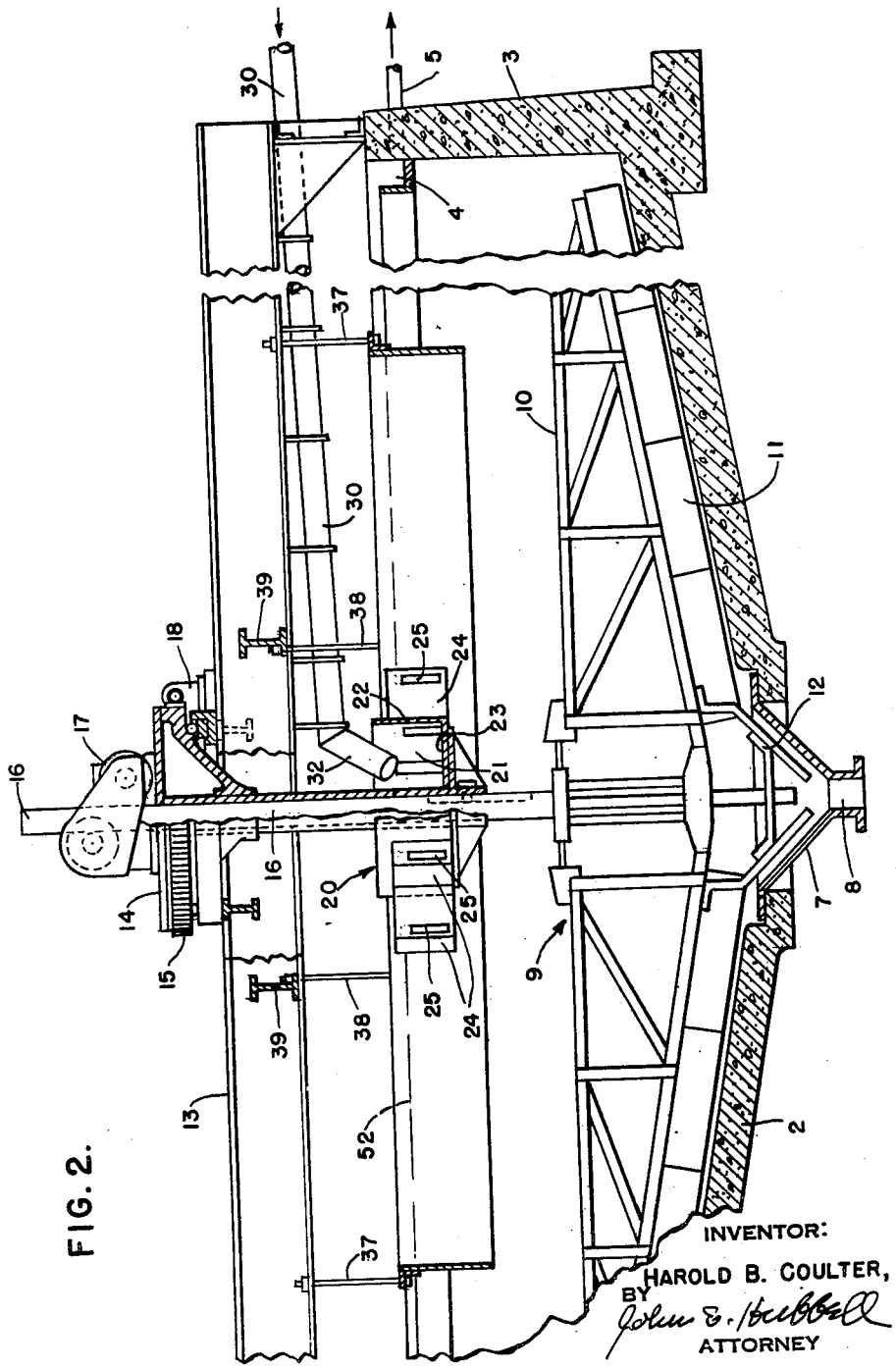
Fig. 2 is a sectional elevation, partly broken away, of the apparatus shown in Fig. 1.

Insofar as above described, the apparatus shown in Figs. 1 and 2 is of well known conventional type, and includes nothing as claimed novel herein.

The desirable form of the invention shown in Figs. 1 to 4 comprises a novel flocculation unit 20 coaxial with, attached to, and supported by the shaft 16. The unit 20 comprises a flocculation chamber 21 which serves as a feed well and has a peripheral wall 22 and a flat bottom wall 23 through which the shaft 16 extends. The chamber 21 is open at its upper end, and the upper edge of the peripheral wall 22 is slightly above the liquid level in the basin 1.

The unit 20 comprises a plurality of liquid conducting arms or discharge conduits 24 which are attached to the cylindrical wall 22 and are shown as extending radially away from the outer side of the latter. As shown, there are eight discharge conduits or spouts symmetrically spaced about the axis of the chamber 21. The discharge conduits or spouts are arranged to form tortuous flow passages receiving liquid from the chamber 21 and discharging it into the sedimentation space surrounding and adjacent to the unit 20. As shown, each discharge conduit is an elongated rectangular box-like structure open at its inner end and at its top and closed at its outer end and formed with a lateral outlet 25 in each of the leading and trailing sides of each arm 24, adjacent the closed outer end of the latter.

The spout or arm structure in the preferred form shown, includes internal baffles arranged to cause the liquid flow therethrough to the outlets 25 to follow tortuous paths. As shown, the baffles comprise two similarly disposed vertical plates 26 having their outer side surfaces flush with the inner vertical edges of the two lateral outlets 25, with and having the horizontal distance between the adjacent edges of the plates 26 greater than the plate width. Intermediate its plates 26 and its open inner end, each conduit 24 has mounted in it a vertical baffle 27 in the form of a plate transverse to the length of the conduit and attached at its lower end to the bottom wall of the conduit and having its side edges parallel to and spaced away from the adjacent side walls of the spout. The general horizontal flow of liquid through each submerged spout 24 is along undulating lines, as is indicated by the arrows in one of the spouts shown in Fig. 3.

The liquor to be treated is passed into the flocculation and feed well chamber 21 through a supply conduit 30. As shown, the latter has a horizontal body portion suspended from the bridge 13. The discharge end of the supply pipe 30 is closed and down-turned and is provide with two discharge spouts 32 extending horizontally away from the pipe 30 in opposite directions and having their discharge ends located intermediate the wall 22 and shaft 16. Liquid is discharged into the chamber 21 by each spout 32 in a direction at an angle of 110° or so to the axis of the body of the pipe 30. The liquid thus necessarily flows from the discharge ends of the spouts 32 to the inlet ends of the discharge conduits 24 along diversified paths and thus tends to maintain conditions in the chamber 21 conducive to flocculation actions therein.

In the form of the invention shown in Figs. 1 and 2, a vertical baffle 35 in the form of a hollow cylinder, is suspended from the bridge 13. The baffle 35 is coaxial with the shaft 16 and the body portion of the baffle is spaced away from the shaft by a radial distance substantially greater than the distance from the shaft to the outer ends of the discharge spouts 24. As shown, the upper end of the baffle 35 is slightly above the basin liquid level, and the lower end of the baffle is adjacent but somewhat above the subjacent portions of the rake arms.

As shown, the baffle 35 is suspended from the bridge 13 by hangers 37 connected to the I-beams at the sides of the bridge, and by hangers 38 connecting the baffle to branch beams 39 extending transversely to the length of the bridge 13 and each having one end supported by the bridge and having its other end resting on the basin rim 3. The space surrounded by the baffle 35 and external to the flocculation unit 20, serves as a combination flocculating and sedimentation space in which flocculating actions initiated but not finished in the unit 20, are completed.

In the normal contemplated operation of the apparatus shown in Figs. 1 to 4, the liquid to be treated is continuously supplied to the feed well and flocculation chamber 21 through the oppositely extending outlet conduit branches 32 of the supply pipe 30. The apparatus should be so arranged and operated that in no portion of the flow path between the outlet 32 and the launder 4 will the flow velocity of the liquid exceed one and one-half feet per second, inasmuch as a higher flow velocity in any portion of the apparatus, is apt to cause some breaking up of unsettled flocs of any appreciable magnitude, and a resultant impairment of the settling action.

As previously noted the liquid passed into the feed well must flow along different flow paths to reach the open ends of the different outlet conduits or discharge spouts 24. In consequence, small flocs distributed throughout the feed wall space travel along many intersecting paths, with resultant collisions of flocs moving in different directions or with different velocities. In many cases the colliding flocs cohere and the floc amassments thus effected eventually result in the formation of many floc masses large enough to be readily settleable. The floc collision and cohering actions occurring in the feed well are supplemented by similar actions in the discharge spouts 24, as the liquid moves along pathways through the spouts.

Floc collisions and resultant amassment actions are also effected in the portion of the sedimentation space into which the spout 24 discharge, particularly as the relation of the different spout discharge orifice 25 is such as to insure a multiplicity of collisions of flocs discharged through each outlet 25 of each discharge spout 24 with flocs discharged through the adjacent discharge orifice of the adjacent discharge spout. In the plan view shown in Fig. 3, the dotted lines 40 represent planes parallel to and including the vertical inner edges of the outlet passages 25 of adjacent outlet conduits or spouts 24. Those planes intersect along the vertical line indicated by the point 41. Similarly, the dotted lines 42 represent planes parallel to and including the vertical outer edges of the discharge conduit outlet passages 25, and each point 43 represents the line of intersection of two planes represented by lines 42.

Figure 4:
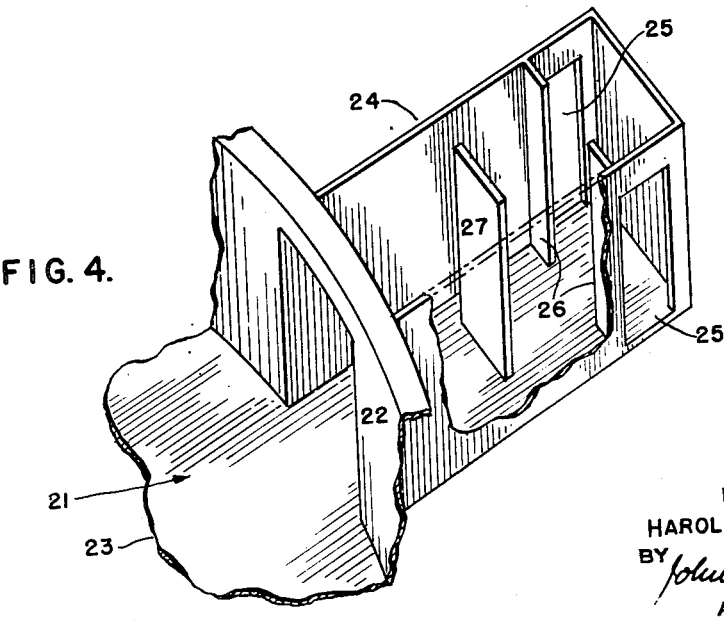
Fig. 4 is a perspective view, partly broken away, of one of the discharge conduits shown in Figs. 1 and 2.

As will be observed, with the particular discharge conduit arrangement shown in Fig. 4, each intersection line 41 is inside the circular path of movement of the outer vertical corner edges of the conduits 24. The precise relation of the intersection lines 41 to the last mentioned path seems to be of little or no importance. It appears to be practically important, however, that the streams discharged through the adjacent outlets 25 of adjacent outlet conduits 24 should so intersect that some of liquid discharged through adjacent outlets 25 of adjacent spouts 24 will pass into, and thence downwardly out of the space defined by each pair of intersecting planes represented by the intersecting lines 40, and by the adjacent wide walls of the adjacent discharge spouts 24, and by the portion of the feed well wall 22 between said side walls. In such case there is ample opportunity for numerous small flocs in said streams to come into contact with one another, and for numerous small flocs to collect and to be deflected by the external surface portions of the flocculation structure.

As will be apparent from Fig. 2 the discharge spouts 24, which are open at their upper sides, have their outlets 25 submerged, so that none of the liquid passing away from the feed well 21 passes upward out of the different spouts 24. With a maximum solids-flocculating speed of not more than 1½ feet per second, and with the slow angular velocity of the element 20, the paths of the drifting flocs passing away from the outlets 25, are not as definite and sharply defined as the above mentioned dotted lines 40 and 42 and the hereinafter mentioned lines 44 and 45 may suggest. Moreover, it seems probable that the flows adjacent the planes represented by the lines 40 and 42, may be different at different levels.

However, when oppositely directed flows cross each other, deflection of floc particles in the crossing streams is inevitable, and all such deflections contribute to good flocculation. Flocculation is more or less the function of suspended solids colliding with each other because at the point of collision there is a marked tendency for such fine solids to cohere and thus form larger flocked solids. This coherence of fine solids into larger solids comprises flocculation, and then continued agitation, and especially rolling type of agitation, tends to roll up and contact the larger flocs, which makes them more readily settleable.

Figure 3:
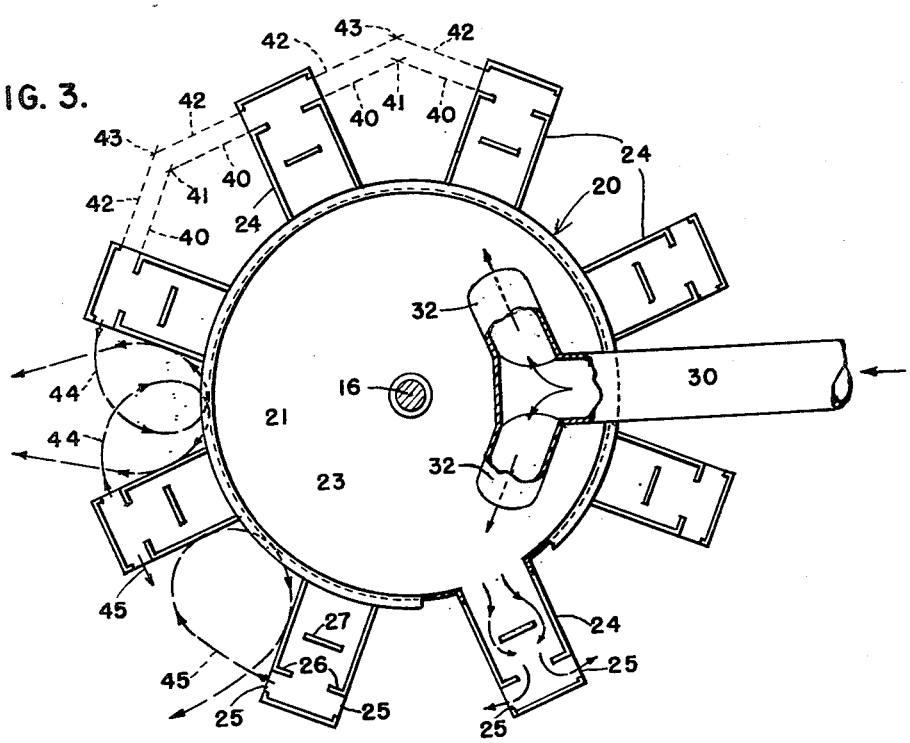
Fig. 3 is a plan view of a flocculation unit shown in Fig. 2, but not visible in Fig. 1.

It seems clear that flocs entrained in the liquid discharged through adjacent outlets 25, flow along a multiplicity of different paths, some of which are believed to be of the character of those indicated in Fig. 3 by the lines 44 and 45. As indicated, the flocs flowing along such lines engage the external surfaces of the rotating feed well structure and are thereby deflected so that some of those flocs may successively engage said external wall portions a plurality of times. Such engagements and resultant floc deflections contribute to an increase in the magnitude and rapidity of the floc settling action. While the lines 44 and 45 are based upon surmise and not on direct flow path observations, the surmises appear reasonable and provide explanations for the otherwise apparently unexplainable high floc settling efficiency obtainable in the use of apparatus of the character shown in Figs. 1–4.

The circular baffle 35 appears to augment the floc amassment and settling actions obtainable with the unit 20, primarily I believe, by prolonging the average period during which each floc particle is kept in proximity to the various discharge spouts 24.

By way of illustration and example, and not by way of limitation, it is noted that apparatus of the particular design shown in Figs. 1–4, was designed for use in treating garbage and has dimensions as follows:

Basin diameter is 50 feet
Baffle diameter is 25 feet
Feed well diameter is 4 feet
Feed well depth is 1 foot
Discharge spout length is 1.375 feet
Discharge spout depth is 11 inches
Discharge spout submergence is 1 foot In another embodiment of the invention of a design generally similar to that illustrated in Figs. 1–4, and intended for use in separating flue dust from water, the dimensions are as follows:

Basin diameter is 140 feet
Baffle diameter is 50 feet
Feed well diameter is 15 feet
Feed well depth is 4 feet
Discharge spout length is 4 feet
Discharge spout depth is 3 feet 5½ inches
Discharge spout submergence is 3 feet The dimensions of the two embodiments of the invention just stated by way of illustration and example, and the manner in which the dimensions of the two embodiments differ, evidence the fact that the invention is adapted for use in apparatus varying widely in size and in the relative dimensions of its elements, as well as in its form, and the immediate purpose of its intended use.

Figure 5:
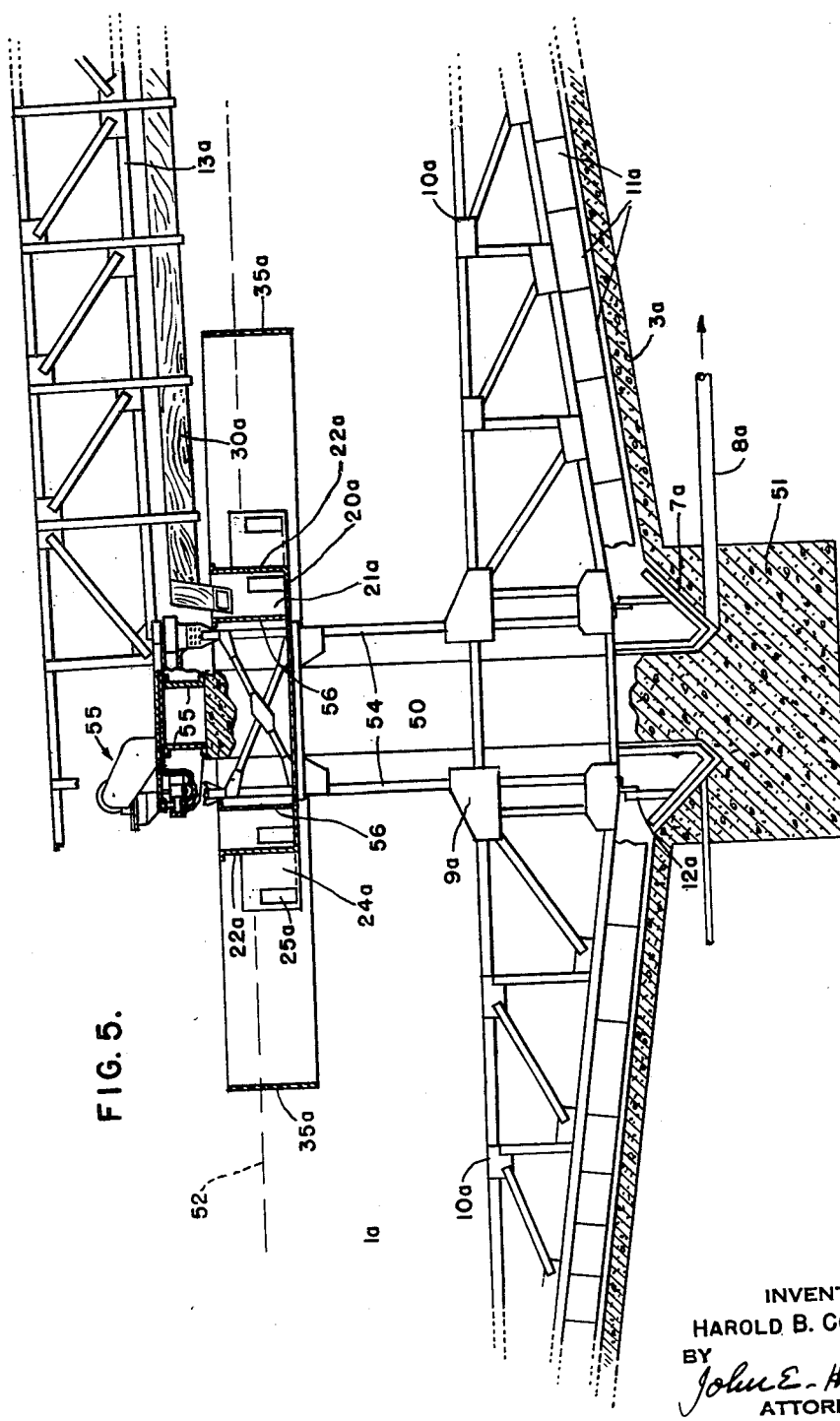
Fig. 5 is a sectional elevation illustrating a modification of the form of apparatus shown in Figs. 1 and 2.

Thus, for example, the invention may be advantageously used in some cases in flocculation and sedimentation apparatus of the center pier type shown in Fig. 5. That apparatus shown comprises numerous elements similar or analogous to elements of the apparatus shown in Figs. 1–4. Such elements are designated by the same reference numerals in Fig. 5 as in Figs. 1–4, but in Fig. 5 each such numeral is followed by a subscript $a$. The fundamental structural difference between the apparatus shown in Fig. 5 and that shown in Figs. 1–4, is the provision in Fig. 5 of a center pier 50, ordinarily formed of concrete and extending upward from concrete base block 51 to a level above the liquid level 52 in the sedimentation basin 1$a$. At its upper end, the pier 50 supports a metallic top structure 55. The latter supports a rake structure 9$a$ through depending suspension rods 54. The metallic structure 53 supports a driving mechanism 55 which need not be described or illustrated in detail, as rake rotating mechanism mounted on the center pier of sedimentation apparatus is well known in the art. In Fig. 5, the sedimented solids or "mud" moved to the center of the basin 1$a$ by the rake blades 11$a$, passes into an annular channel 7$a$ from the bottom of which the mud is withdrawn through an outlet pipe 8$a$.

The apparatus shown in Fig. 5 includes a flocculation and feed well unit 20$a$ which differs essentially from the unit 20 of Figs. 1–4, only in that the feed well 21$a$ is annular in form and surrounds an upper end portion of the pier 50. The unit 20$a$ comprises a cylindrical wall 56 concentric with the peripheral wall 22$a$ of the unit, and forming the inner vertical wall of the feed well chamber 21$a$. The outer feed well wall 22$a$ is provided with discharge conduits or spouts 24$a$ which may be similar in structure and disposition to the discharge spouts 24 of Figs. 1–4. The liquid treated in the apparatus shown in Fig. 5 is passed into the feed well 21$a$ in any convenient manner. For example, it may be passed into the feed well through a supply channel formed in the center pier 50 in the known manner illustrated, for example, in the Talbot et al. Patent 2,291,772 of August 4, 1942. As shown, however the liquid is supplied through a conduit 30$a$ suspended above the normal liquid level in the basin 1$a$ by hangers depending from the walk-way 13$a$ which has one end supported by the pier 50 and has its other end supported by the basin rim or other structure, not shown, which is external to the basin space. In Fig. 5, as in Figs. 1–4, the discharge conduits are in the form of submerged troughs open at their upper sides with vertical baffles therein forming meandering flow paths between the conduit inlets and outlets.

The apparatus shown in Fig. 5, comprises a baffle or curtain wall 35$a$ which serves the same general purpose as the baffle or curtain wall 35, shown in Figs. 1 and 2, and the general operation of the apparatus shown in Fig. 5 is like that of the apparatus shown in Figs. 1–4. For use in relatively large diameter sedimentation units, the center pier type has certain known structural advantages in respect to the supporting means for the rake structure and its rotating mechanism.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The process of flocculating solids in liquid suspension, which comprises establishing and maintaining a turning annular body of such suspension, feeding such suspension thereto with sufficient velocity to effect mobilization of solids of the suspension and to effect motion of such suspension through the annular body at solids flocculating speed, deflectingly drifting suspension from the turning body into a body of sedimenting suspension at a plurality of points laterally extending from the periphery of the turning body and in directions generally parallelling the direction of motion of that body.

2. Combined flocculation and sedimentation apparatus for treating solids suspended in liquids, comprising a liquid-holding sedimentation basin having feeding means and clarified effluent overflow means as well as means for discharging sediment from the bottom of the basin, and flocculation means including a feedwell into which is delivered feed from the feeding means having a turnable peripheral wall from which laterally extend liquid-conducting arms presenting to liquid passing therethrough a tortuous path and provided with emission ports on the leading and on the trailing sides of the arms.

3. Combined flocculation and sedimentation apparatus for treating solids suspended in liquids, comprising a liquid-holding sedimentation basin having feeding means and clarified effluent overflow means as well as means for discharging sediment from the bottom of the basin, and flocculation means including a feedwell into which is delivered feed from the feeding means characterized by an annular trough having a turnable peripheral wall from which laterally extend liquid-conducting arms presenting to liquid passing therethrough a tortuous path and provided with emission ports on the leading and on the trailing sides of the arms.

4. Combined flocculation and sedimentation apparatus including a sedimentation space surrounding a vertical central axis and having an upper effluent outlet determining the normal liquid level in said space, partition means surrounding and rotatable about said axis and arranged to divide said space into an upper central flocculation section including a feedwell and a sedimentation section which surrounds and underlies the flocculation section, said partition means comprising discharge conduits having inlet openings in communication with said feed well at a distance from said axis and having outlets distributed about said axis and each arranged to discharge liquid received from the feed well into said sedimentation section in a stream inclined to a line extending radially from said axis to said outlet openings, said discharge conduits being arranged to provide tortuous passage for liquid passing from the feed well to said outlets, said space having a bottom sediment outlet adjacent said axis, structure rotatable about said axis and attached to and supporting said partition means and including rake arms for moving sediment material towards said sediment outlet and conduit means for passing a liquid and solid mixture into said feed well.

5. Apparatus as specified in claim 4, in which said discharge conduits extend substantially radially away from said axis, and have lateral outlet openings adjacent their outer ends.

6. Apparatus as specified in claim 4, in which each of said outlet conduits has an outer end portion substantially radial to said axis and has its outer end closed and has side walls each formed with a vertically elongated outlet adjacent its closed end.

7. Apparatus as specified in claim 4, in which said discharge conduits are submerged in the liquid in said space.

8. Apparatus as specified in claim 4, in which said discharge conduits are submerged in the liquid in said space and each of which is open at its upper side and has side walls with lateral outlets therein.

9. Apparatus as specified in claim 4, in which each of said outlet conduits has an outer end portion substantially radial to said axis, and has its outer end closed and is formed with a lateral outlet arranged to discharge a liquid stream intersecting a liquid stream discharged by the adjacent lateral outlet of an adjacent discharge conduit.

10. Apparatus as specified in claim 4, in which said discharge conduits are in the form of horizontal troughs each open at its upper side and vertical baffle members in each trough which cooperate to form a meandering flow path between the inlet and outlet openings of the conduit.

11. Apparatus as specified in claim 4, including a vertical baffle wall in said space which surrounds and is spaced away from said partition means.

12. Apparatus as specified in claim 11, comprising a bridge extending diametrically across said space above said liquid level and supporting said baffle and said structure.

13. Apparatus as specified in claim 11, comprising a bridge extending diametrically across said space above said liquid level and supporting said baffle and said structure, and in which said conduits means for passing fluid material into said feed well includes a pipe supported by said bridge.

14. Apparatus as specified in claim 11, comprising a vertical pier centrally disposed in said space and supporting said partition means and structure and in which said rake arms support said baffle.

15. The process of flocculating solids in liquid suspension, which comprises establishing and maintaining an annular body of such suspension, feeding such suspension thereto with sufficient velocity to effect mobilization of solids of the suspension and to effect motion of such suspension through the annular body at solids flocculating speed, deflectingly drifting suspension from the annular body into a body of sedimenting suspension at a plurality of points laterally extending from the periphery of the annular body and in directions tangential to said annular body.

16. Combined flocculation and sedimentation apparatus for treating solids suspended in liquids, comprising a liquid-holding sedimentation basin having feeding means and clarified effluent overflow means as well as means for discharging sediment from the bottom of the basin, and flocculation means including a feedwell into which is delivered feed from the feeding means having a peripheral wall from which laterally extend liquid-conducting arms presenting to liquid passing therethrough a path of flow and provided with oppositely facing tangential emission ports at the opposite sides of the arms.

17. Apparatus as specified in claim 16 in which the path of flow presented to the liquid passing therethrough is tortuous.

18. Combined flocculation and sedimentation apparatus for treating solids suspended in liquids, comprising a liquid-holding sedimentation basin having feeding means and clarified effluent overflow means as well as means for discharging sediment from the bottom of the basin, and flocculation means including a feedwell into which is delivered feed from the feeding means characterized by an annular trough having a peripheral wall from which laterally extend liquid-conducting arms presenting a path of flow to liquid passing therethrough and provided with oppositely facing emission ports at the opposite sides of the arms.

19. Combined flocculation and sedimentation apparatus including a sedimentation space surrounding a vertical central axis and having an upper effluent outlet determining the normal liquid level in said space, partition means surrounding said axis and arranged to divide said space into an upper central flocculation section including a feed well and a sedimentation section which surrounds and underlies the flocculation section, said partition means comprising discharge conduits having inlet openings in communication with said feed well at a distance from said axis and having outlets distributed about said axis and each arranged to discharge liquid received from the feed well into said sedimentation section in a stream inclined to a line extending radially from said axis to said outlet openings, said discharge conduits being arranged to provide passage for liquid passing from the feed well to said outlets, said space having a bottom sediment outlet structure, rotatable about said axis and attached to and supporting said partition means and including rake arms for moving sediment material towards said sediment outlet and conduit means for passing a liquid and solid mixture into said feed well.

References Cited in the file of this patent

UNITED STATES PATENTS

| Number | Name | Date |
|---|---|---|
| R. 21,940 | Darby et al. | Nov. 11, 1941 |
| 1,678,788 | Remick | July 31, 1928 |
| 2,021,304 | Hardinge | Nov. 19, 1935 |
| 2,143,750 | Darby et al. | Jan. 10, 1939 |
| 2,185,785 | Dorr et al. | Jan. 2, 1940 |
| 2,263,168 | Dorr | Nov. 18, 1941 |
| 2,267,516 | Adams | Dec. 23, 1941 |
| 2,274,361 | Darby | Feb. 24, 1942 |
| 2,291,772 | Talbot et al. | Aug. 4, 1942 |
| 2,296,824 | Ashworth | Sept. 29, 1942 |
| 2,348,123 | Green et al. | May 2, 1944 |
| 2,365,293 | Robinson | Dec. 19, 1944 |
| 2,370,356 | Kamp et al. | Feb. 27, 1945 |
| 2,419,004 | Bieker et al. | Apr. 15, 1947 |